United States Patent
Park et al.

(10) Patent No.: US 10,528,443 B2
(45) Date of Patent: Jan. 7, 2020

(54) VALIDATION OF MULTIPROCESSOR HARDWARE COMPONENT

(71) Applicants: SAMSUNG LTD., Hwaseong-si (KR); INTERNATIONAL BUSINESS MACHINES CORPORATION, Armonk, NY (US)

(72) Inventors: Sung-Boem Park, Hwaseong-si (KR); Amir Nahir, Megadim (IL); Vitali Sokhin, Haifa (IL); Wisam Kadry, Haifa (IL); Jin Sung Park, Hwaseong-si (KR); Ara Cho, Hwaseong-si (KR)

(73) Assignees: SAMSUNG ELECTRONICS CO., LTD., Hwaseong-si (KR); INTERNATIONAL BUSINESS MACHINES CORPORATION, Armonk, NY (US)

( * ) Notice: Subject to any disclaimer, the term of this patent is extended or adjusted under 35 U.S.C. 154(b) by 335 days.

(21) Appl. No.: 14/610,167

(22) Filed: Jan. 30, 2015

(65) Prior Publication Data

US 2016/0224452 A1  Aug. 4, 2016

(51) Int. Cl.
*G06F 11/00* (2006.01)
*G06F 11/22* (2006.01)

(52) U.S. Cl.
CPC ............... *G06F 11/2242* (2013.01)

(58) Field of Classification Search
CPC ... G06F 11/2242; G06F 11/2736; G06F 11/27
USPC ...................................... 714/30, 31
See application file for complete search history.

(56) References Cited

U.S. PATENT DOCUMENTS

| | | | | |
|---|---|---|---|---|
| 5,675,546 A | * | 10/1997 | Leung | G11C 29/02 365/185.09 |
| 5,938,765 A | * | 8/1999 | Dove | G06F 9/4401 713/1 |
| 6,178,445 B1 | * | 1/2001 | Dawkins | G06F 11/1417 709/208 |
| 7,010,722 B2 | * | 3/2006 | Jahnke | G06F 11/2242 324/750.3 |
| 7,036,106 B1 | * | 4/2006 | Wang | G06F 9/30145 703/15 |
| 7,249,300 B2 | | 7/2007 | Chung | |
| 7,818,746 B2 | | 1/2010 | Anderson | |

(Continued)

FOREIGN PATENT DOCUMENTS

JP       2005252189 A       9/2005

*Primary Examiner* — Elmira Mehrmanesh
(74) *Attorney, Agent, or Firm* — Tutunjian & Bitetto, P.C.

(57) ABSTRACT

A method, apparatus and computer program product to be employed by a hardware component under validation, wherein the hardware component having a plurality of processing units each belonging to one of at least two types, such that one of the at least two types of processing units is less error-prone than a remainder of the at least two types. The method comprising: designating one of the processing units of the hardware component under validation that belongs to the less error-prone type as a manager processing unit; initiating execution of a tester program code for testing processing units, by processing units of the hardware component other than the manager processing unit; and, monitoring by the manager processing unit the status of the processing units during execution of the tester program code.

16 Claims, 3 Drawing Sheets

(56) References Cited

U.S. PATENT DOCUMENTS

| | | | |
|---|---|---|---|
| 7,747,908 B2 | 6/2010 | Choudhury | |
| 8,006,136 B2 | 8/2011 | Kube | |
| 8,127,192 B2 | 2/2012 | Arora | |
| 8,181,067 B2 | 5/2012 | McGowan | |
| 8,566,570 B2 * | 10/2013 | Housty | G06F 9/4405 709/208 |
| 8,875,142 B2 * | 10/2014 | Shivanna | G06F 9/4881 714/1 |
| 9,171,110 B2 * | 10/2015 | Deindl | G06F 17/5027 |
| 2008/0005538 A1 * | 1/2008 | Apparao | G06F 9/5027 712/220 |
| 2009/0063903 A1 * | 3/2009 | Smolski | G06F 11/3672 714/38.13 |
| 2009/0089636 A1 | 4/2009 | Fernsler | |
| 2010/0262879 A1 * | 10/2010 | Floyd | G01R 31/31724 714/733 |
| 2010/0332991 A1 * | 12/2010 | Banerjee | H04L 41/12 715/736 |
| 2012/0204069 A1 | 8/2012 | Hughes | |
| 2012/0304184 A1 * | 11/2012 | Yamashita | G06F 9/505 718/102 |
| 2014/0143463 A1 * | 5/2014 | Mou | G06F 11/349 710/110 |
| 2014/0298060 A1 * | 10/2014 | Hooker | G06F 1/3293 713/323 |
| 2015/0338902 A1 * | 11/2015 | Mittal | G06F 1/3234 713/320 |

* cited by examiner

VALIDATION OF MULTIPROCESSOR HARDWARE COMPONENT

TECHNICAL FIELD

The present disclosure relates to hardware validation in general, and to validation of multiprocessor hardware components, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During testing phase, developers, QA staff members, and the like test a newly developed hardware design to verify that it operates properly. In some cases, test cases (also referred to simply as "tests") may be devised to provide stimuli to the component, and enable testing whether its operation is correct (e.g., as expected).

In recent years, multiprocessing architectures wherein two or more processors, often referred to as "cores", are being employed in concurrent individual execution of instruction sets within a common computing environment, optionally sharing system resources, have become ubiquitous among many computing devices and platforms, whether on enterprise level or within mobile and embedded systems.

As can be readily understood, each additional processor effectively raises the number of calculation operations that can be performed simultaneously, thereby allowing for improved functionality such as for example increased efficiency and speed through parallel computing, or alternatively supporting fail-safe mechanism by exploiting redundant processors for backup purposes.

However, with the growing hardware intricacy, the task of testing a new design once fabricated has become an even more challenging endeavor. Typically, the validation phase entails repeated execution of resource intensive program instructions, utilizing the entire design functionality, for extended periods of time. Such procedure is commonly known as "stress test", since it explores system performance under extreme conditions. In the context of multiprocessing, a multi-process or multi-threaded stress test program is run on all processors of the hardware design undergoing validation.

BRIEF SUMMARY

One exemplary embodiment of the disclosed subject matter is a method performed by a hardware component to be validated, wherein the hardware component having a plurality of processing units each belonging to one of at least two types, such that one of the at least two types of processing units is less error-prone than a remainder of the at least two types, the method comprising: designating one of the processing units of the hardware component under validation that belongs to the less error-prone type as a manager processing unit; initiating execution of a tester program code for testing processing units, by processing units of the hardware component other than the manager processing unit; and, monitoring by the manager processing unit the status of the processing units during execution of the tester program code.

Another exemplary embodiment of the disclosed subject matter is an apparatus incorporated within a hardware component to be validated, wherein the hardware component having a plurality of processing units each belonging to one of at least two types, such that one of the at least two types of processing units is less error-prone than a remainder of the at least two types, the apparatus comprising: a designation component for designating one of the processing units of the hardware component under validation that belongs to the less error-prone type as a manager processing unit; a test starter component for initiating execution of a tester program code for testing processing units, by processing units of the hardware component other than the manager processing unit; and, a monitoring component for monitoring by the manager processing unit the status of the processing units during execution of the tester program code.

Yet another exemplary embodiment of the disclosed subject matter is a computer program product comprising a non-transitory computer readable storage medium retaining program instructions for execution by a hardware component to be validated, wherein the hardware component having a plurality of processing units each belonging to one of at least two types, such that one of the at least two types of processing units is less error-prone than a remainder of the at least two types, the product comprising: a first section of program instructions for designating one of the processing units of the hardware component under validation that belongs to the less error-prone type as a manager processing unit; a second section of program instructions for initiating execution of a tester program code for testing processing units, by processing units of the hardware component other than the manager processing unit; and, a third section of program instructions for monitoring by the manager processing unit the status of the processing units during execution of the tester program code.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

In order for the stress test to be effective, there is a need to enable immediate detection of errors or other abnormal events upon occurrence, as well as the recordation, colloquially termed "dumping", of any pertaining data of the system and program state at the time considered necessary for coming up with a fix to the problem. Accordingly, the progress of the stress test program on each processor that it runs on has to be closely monitored. Moreover, the overall success of the validation process is dependent upon all operations of system initialization, program monitoring and dumping of data in case of a failure, are being performed reliably and accurately.

In some systems, this problem may be solved by having an auxiliary processor of a simpler and more mature design, thereby guaranteeing its reliability, which is able to initialize the system, monitor the status of the stress test program execution, and dump the vital debug data. The auxiliary processor may be separate from the Design Under Test (DUT) itself and not be under validation. The auxiliary processor may be a processor that is designed to provide auxiliary services to the DUT, such as but not limited to diagnostics, run-time error detection and correction, or the like. However, some systems do not have a dedicated external processor with the required system management capabilities. Such a processor may also consume on-chip resources and may therefore not be desired. Moreover, the auxiliary processor might not be able to access memory or caches of the DUT. As an example, if Package-on-Package (PoP) is used, wherein two or more hardware component packages are stacked atop of each other, e.g. memory and logic packages. In PoP, connections between the processor and the main memory may not be exposed to the auxiliary processor. In some cases, cache coherency is not supported between the DUT and the auxiliary processor and therefore the auxiliary processor may not necessarily view a correct state of the cache. In addition, an auxiliary processor may not use the same instruction set as the DUT, which may complicate programming and handling testing functions.

A recently suggested heterogeneous system architecture called "big/LITTLE" includes two types of processors, being functionally identical yet differing in complexity and optionally in maturity. One type, called "big", is of powerful processors that have a more complex design. In some cases, the "big" processor may be a newer version of the other type of processors. Another type, called "LITTLE", is of simpler and less powerful cores, for example a remap of older design to a new technology. Specifically, "big/LITTLE" systems currently on the market do not have an auxiliary processor to be entrusted with the role of managing the system validation process.

One technical problem dealt with by the disclosed subject matter is to accommodate for a relatively reliable and accurate performance of initialization, run-time monitoring and debug data dumping during validation of a fabricated multiprocessor hardware design ("post-silicon"), wherein no dedicated external processor for that effect is present.

Another technical problem is the assignment of management tasks, including inter alia initializing, monitoring and, upon failure, dumping the debug data, during validation of a physical instance of a hardware design having a heterogeneous system architecture, with at least two types of processors such that one type is considered more reliable than the other.

One technical solution is to assign the manager role to a processing unit of the design under validation, also referred to as "core" interchangeably throughout the present disclosure, which is of the more reliable type, and performing stress testing routines on a remainder of the cores of the DUT.

Optionally, the identity of the manager core may be fixed or predetermined before run-time, i.e. before loading of the stress test program onto the DUT. Alternatively, the manager core may be assigned dynamically during run-time, for example, by using a voting scheme among relevant candidates.

Upon loading a stress test program to the system, a manager core is assigned. Once assigned, the manager core initializes the different components required for the operation of the system, and thereafter signals the other cores that they may begin operation, namely the execution of a stress test program. The manager core tracks the progress and health of the other cores at run-time. When a problem is detected, the manager core dumps the required debug data, for example, via a Universal Asynchronous Receiver/Transmitter (UART) interface.

In some exemplary embodiments, once a problem has been detected, the manager core stops execution of the stress test program on the other cores prior to dumping the debug data.

In some further exemplary embodiments, the manager core is the sole component interacting with external environments, for example, to report progress and dump debug data when needed. By blocking other cores from interacting with the external environment, their functionality may be simplified and they may operate with a relatively thin software layer providing Operating System (OS)-like services. As a result, there may be a lower probability that complicated software would invoke an erroneous functionality in the DUT while performing managerial roles such as interacting with external environment and reporting on detected bugs.

One technical effect of utilizing the disclosed subject matter is to provide a manager core that is less likely to be affected by design flaws. It will be appreciated that a bug in the manager core may cause debug data to be corrupted or unavailable, and may therefore waste the scarce resource of the silicon DUT platform that is being tested. In some cases, the disclosed subject matter may provide relatively high utilization of the platform, by determining that a problem has been found soon after it is first detected in one of the cores, so that execution of the stress test program may be terminated and, after dumping of the debugging data, the system may be freed for running further tests.

Figure 1:
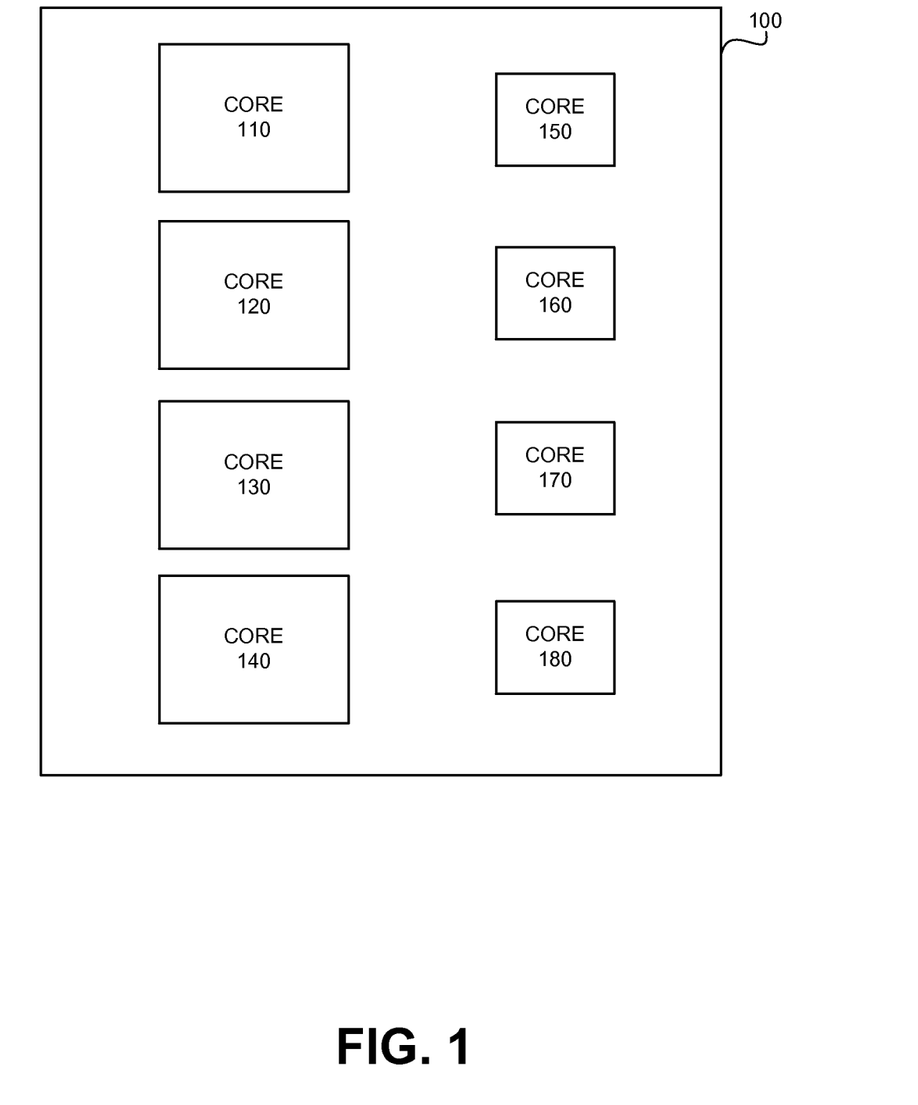
FIG. 1 shows a schematic illustration of a heterogeneous multiprocessor hardware component in which the disclosed subject matter is used, in accordance with some exemplary embodiments of the subject matter.

Referring now to FIG. 1 showing a schematic illustration of a heterogeneous multiprocessor hardware component in which the disclosed subject matter is employed, in accordance with some exemplary embodiments of the subject matter.

In some exemplary embodiments, a multiprocessor 100 may comprise a plurality of cores 110, 120, 130, 140, 150, 160, 170 and 180. The multiprocessor may be a Central Processing Unit (CPU), a System on a Chip (SoC) or the like. The cores 110-180 may be functionally identical and differ only in hardware complexity or design maturity. For example, cores 110-180 may have different microarchitectures that share a common instruction set. Additionally or alternatively, the cores 110-180 may have a different physical design, e.g. custom designed vs. non-custom designed, wherein non-custom design may be automatically synthesized from a digital representation of a design, such as provided in Register Transfer Level (RTL), or the like.

In some exemplary embodiments, the cores 110-180 belong to one of two types of processors, the first of which is considered less error-prone than the other. For example, as illustrated in FIG. 1, multiprocessor 100 may employ "big\LITTLE" architecture, such that cores 110-140 belong to one type, referred to as "big", of powerful and optionally newly designed processors, whereas cores 150-180 belong to another type, referred to as "LITTLE", of a simpler and/or more mature design, thus considered as relatively more reliable.

It will be understood however that multiprocessor 100 may comprise any number of cores of either type, as well as an unequal number of cores in each. It will be further understood that multiprocessor 100 may comprise more than two types of functionally identical processors differing in complexity and/or maturity.

In some cases, multiprocessor 100 may not comprise an auxiliary processor which provides auxiliary services to the multiprocessor 100. Multiprocessor 100 may comprise only cores that are part of the functionality of the multiprocessor 100. Additionally or alternatively, an auxiliary processor may be present but may not be available for use during stress testing.

Figure 2:
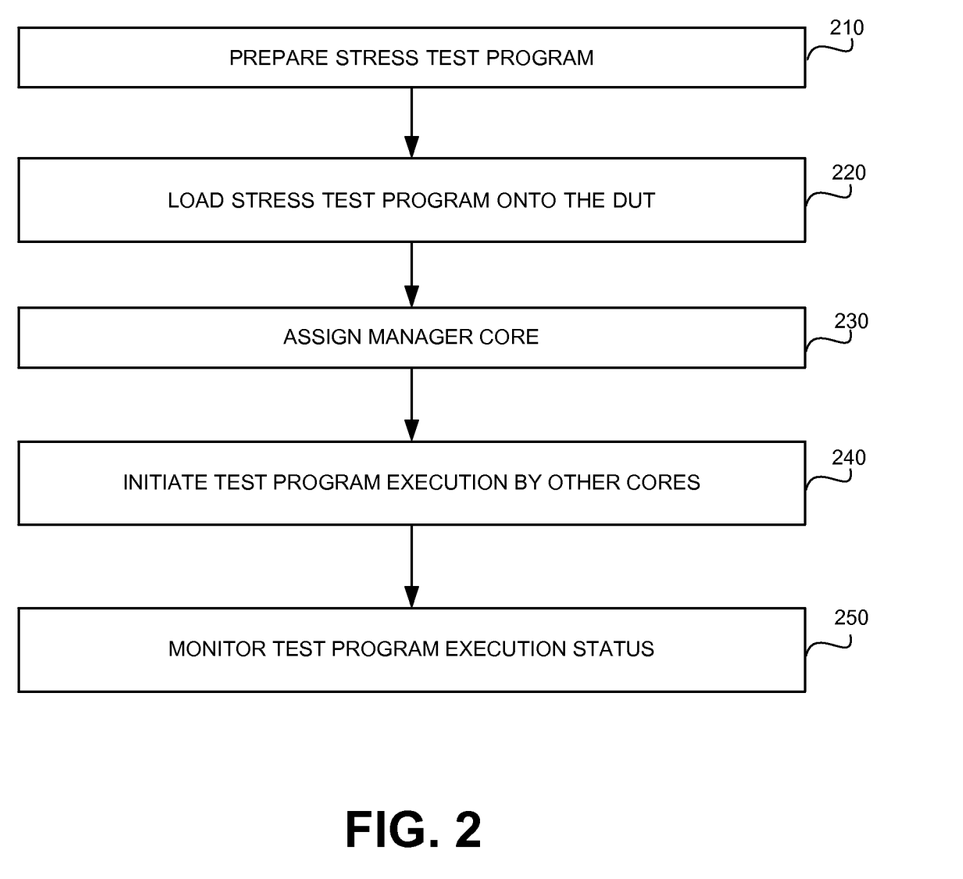
FIG. 2 shows a flowchart diagram of a method for testing a hardware design, in accordance with some exemplary embodiments of the disclosed subject matter.

Referring now to FIG. 2 showing a flowchart diagram of a method for testing a hardware design in accordance with some exemplary embodiments of the disclosed subject matter.

On Step 210, a stress test program may be prepared for a multi-core DUT. The stress test program may be configured to cause a core to repeatedly (1) create a test, (2) execute the test, and (3) check the results of the test. The stress test program may be generated off-platform and be loaded to the DUT itself for execution. The stress test program may be generated for the multi-core DUT using a generation framework.

On Step 220, the stress test program is loaded onto the DUT. The stress test program may be executed by the DUT. In some exemplary embodiments, the stress test program may spawn processes or threads for each processing unit of the DUT.

On step 230, a processing unit of a multi-core design under test is designated as manager of the design validation process, from the portion of cores that are of a more robust type. In some exemplary embodiments, the design under test is a heterogeneous system such as multiprocessor 100 depicted in FIG. 1, and the manager core assigned is one of the "LITTLE" type cores 150-180, being relatively more fault-resistant than "big" type cores 110-140.

In some exemplary embodiments, the assignment of the manager core is dynamically determined during run-time using a voting mechanism among relevant candidates, after completion of initial boot process by the system. For example, each "LITTLE" core commences executing the stress test program. A run-time race may be performed between all such cores so that the first core to complete its boot process may take the role of the manager core. For that purpose, the cores may be able to communicate with one another. In some exemplary embodiments, the cores may be able to communicate with one another only after system initialization is completed.

Alternatively, the assignment of the manager core may be predetermined before run-time, under two possible scenarios for the preparation of the stress test program, as follows. In the first scenario, the identity of the manager core is fixed, by being hardcoded in the generation framework utilized in Step 210, so that each generated stress test program is configured to use the same core as the manager core. In the second scenario, the identity of the manager core is static, by being chosen as part of the building process of the stress test program. Accordingly, the identity of the manager core may either be determined by an automatic builder of stress test programs (e.g., the generation framework), forced through parameters specified by a user during the generation of the program, or the like.

On step 240, execution of a stress test program routine, designed to explore the performance capabilities and proper functioning of a processing unit in the DUT, is initiated in cores other than the assigned manager core. In some cases, the cores may commence performing the stress test only after being notified that the manager core has completed its initialization process and is ready to monitor them. Additionally or alternatively, the cores may be configured to wait until a flag is raised by the manager core before commencing the stress testing.

On step 250, the manager core monitors the status of the other cores during execution of the stress test program instructions. The monitoring can be effected, for example, by the manager core keeping track of a counter updated by the other cores to indicate progress, or tracking system resources to determine that the other cores are making progress, e.g. by reading test cases of the other cores and checking that they are being re-generated from time to time.

As can be readily understood, in order for the manager core to be able to monitor the progress of the other cores, there may be some basic communication mechanism available between the manager core and the other cores, such as a predetermined shared memory location, or common access to system resources.

It is also further understood that, the monitoring by the manager core of the progress in execution of the stress test program by the other cores may be required in order to determine if the testing is going on as expected or a problem has been detected. In some exemplary embodiments, the manager core may monitor an "I am alive" flag handled by each core, wherein upon a detection of a bug, the core may reset the flag. The manager core may detect when to dump debug data based on the value of the flag.

Figure 3:
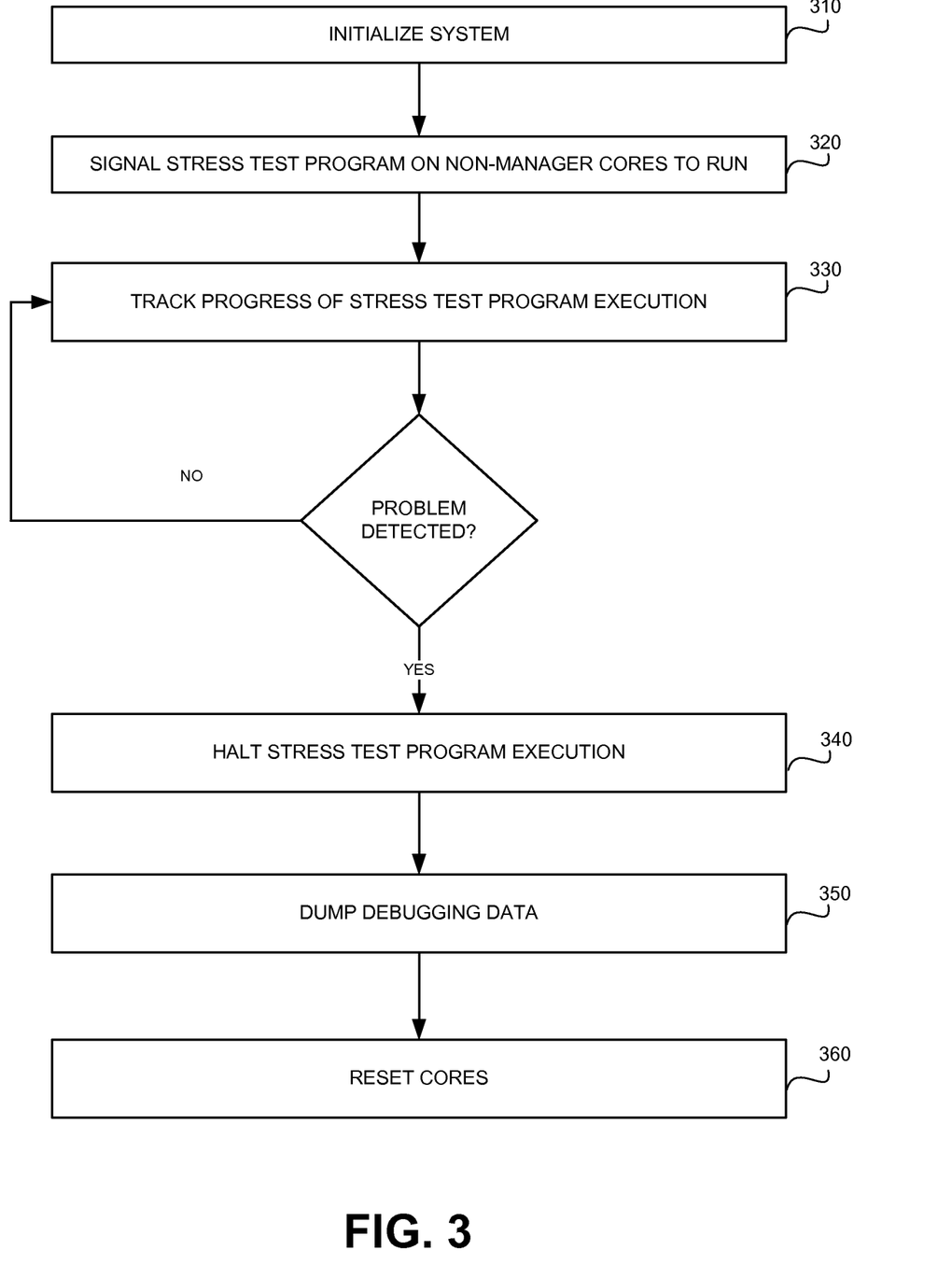
FIG. 3 shows a flowchart diagram of a method for hardware design validation management, in accordance with some exemplary embodiments of the disclosed subject matter.

Referring now to FIG. 3 showing a flowchart diagram of a method for hardware design validation management in accordance with some exemplary embodiments of the disclosed subject matter.

On step 310, system initialization takes place. The manager core, once assigned, completes its boot code execution and thereafter diverges from the standard execution flow. While all non-manager cores go to some wait/sleep mode, the manager core turns to initialize the system, for example, by executing driver-like code which initializes the different components of the system.

On step 320, after the initialization code is executed, the manager core turns to signal the other cores, using for example an interrupt, that they can exit wait/sleep mode and resume execution.

On step 330, after completing the initialization procedure, the manager core turns to track and monitor the execution of the stress test program on the other cores. In some exemplary embodiments, the manager core does not take part in the generation and testing flow that the other cores execute, to minimize the probability of having the manager core stuck and the debug data lost.

On step 340, once a problem has been detected, the manager core optionally stops execution of the stress test program by the other cores. Halting operation of the non-manager cores may be necessary to prevent a bus hang, which would, in turn, prohibit the manager core from dumping the debug data. This may be accomplished, for example, through notification to the non-manager cores that a problem has been found, by means of a shared location in memory or an interrupt.

On step 350, the manager core dumps the debugging data out to facilitate an effective debugging process. The dumping action may involve creation or gathering of data documenting the test failure and surrounding context into a respective data record, so that it can later be extracted and explored in order to figure out the cause of the bug and, if applicable, determine an appropriate solution for it.

The debugging data may include both system-specific data, such as values obtained from reading special purpose registers or memory, as well as program-specific data. The debugging data may comprise data that is useful for recreating the bug, understanding the cause of the bug, fixing the bug, or the like.

On step 360, the cores may be reset, so that the DUT may thereafter be ready for further testing and the process may be repeated from start (e.g., from either steps 310, 320 or 330).

As can be readily understood, in order for the manager core to be able to dump the data, the manager core may have some means of communicating with the environment, such as a UART connection, as well as the ability to read relevant debugging data from the other cores. This can be done, for example, by placing the relevant parts of the data, such as test-case, in-memory print buffer and the like, in shared memory in locations that the manager core could access.

It should be further understood that the cores of the DUT may employ Shared Memory Architecture (SMA) and may be cache coherent, thereby allowing more qualitative data gathering for debugging purposes, as the memory and caches of the DUT may be accessible by the manager core.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a heterogeneous system architecture hardware component to be validated, wherein the heterogeneous system architecture hardware component having a plurality of hardware processing units each belonging to one of at least two types, such that one of the at least two types of hardware processing units is less error-prone than a remainder of the at least two types, the method comprising:
designating as a manager processing unit one of the hardware processing units of the heterogeneous system architecture hardware component under validation that belongs to the less error-prone type, wherein the less error-prone type is of a more mature design and is more reliable than the remainder of the at least two types; and
performing initialization and run-time monitoring of the hardware component in a reliable manner, comprising:
initiating, by the manager processing unit, execution of a tester program code for testing hardware processing units by hardware processing units of the heterogeneous system architecture hardware component other than the manager processing unit;
monitoring by the manager processing unit the status of the hardware processing units during execution of the tester program code;
creating a data record by the manager processing unit, wherein the data record comprises data related to a test failure detected during execution of the tester program code; and,
halting, by the manager processing unit, execution of the tester program code by hardware processing units of the heterogeneous system architecture hardware component other than the manager processing unit upon detection of a test failure and prior to the data record creation.

2. The method of claim 1, further comprising performing, by the manager processing unit, an initialization procedure prior to execution of the tester program code.

3. The method of claim 2, wherein the initialization procedure by the manager processing unit comprises initializing other system components required by the heterogeneous system architecture hardware component undergoing validation during execution of the tester program code.

4. The method of claim 1, wherein said designation of manager processing unit is determined after the tester program code has been loaded onto the heterogeneous system architecture hardware component under validation.

5. The method of claim 1, wherein said designation of manager processing unit is predetermined prior to the loading of the tester program code onto the heterogeneous system architecture hardware component under validation.

6. The method of claim 1, wherein the at least two types of hardware processing units of the heterogeneous system architecture hardware component under validation are functionally identical.

7. The method of claim 6, wherein the at least two types of hardware processing units of the heterogeneous system architecture hardware component under validation differ in hardware complexity.

8. The method of claim 6, wherein the at least two types of hardware processing units of the heterogeneous system architecture hardware component under validation differ in physical design.

9. The method of claim 6, wherein the heterogeneous system architecture hardware component under validation employs a "big\LITTLE" system architecture.

10. The method of claim 6, wherein the manager processing unit and other processing units of the heterogeneous system architecture hardware component under validation employ Shared Memory Architecture (SMA) and are cache coherent.

11. An apparatus incorporated within a heterogeneous system architecture hardware component to be validated, wherein the heterogeneous system architecture hardware component having a plurality of hardware processing units each belonging to one of at least two types, such that one of the at least two types of hardware processing units is less error-prone than a remainder of the at least two types, the apparatus comprising:

a designation component for designating as a manager processing unit one of the hardware processing units of the heterogeneous system architecture hardware component under validation that belongs to the less error-prone type, wherein the less error-prone type is of a more mature design and is more reliable than the remainder of the at least two types;

a monitoring component for monitoring by the manager processing unit in a reliable manner the status of the hardware processing units during execution of a tester program code, the monitoring component comprising a test starter component for initiating execution of the tester program code for testing processing units by hardware processing units of the heterogeneous system architecture hardware component other than the manager processing unit;

a data dumping component for creating a data record by the manager processing unit, wherein the data record comprises data related to a test failure detected during execution of the tester program code; and a halting component for halting, by the manager processing unit, execution of the tester program code by hardware processing units of the heterogeneous system architecture hardware component other than the manager processing unit upon detection of a test failure and prior to the data record creation.

12. The apparatus of claim 11, further comprising an initialization component for performing, by the manager processing unit, an initialization procedure prior to execution of the tester program code.

13. The apparatus of claim 11, wherein said designation component further comprises a determination component for determining the manager processing unit designation.

14. A computer program product comprising a non-transitory computer readable storage medium retaining program instructions for execution by a heterogeneous system architecture hardware component to be validated, wherein the heterogeneous system architecture hardware component having a plurality of hardware processing units each belonging to one of at least two types, such that one of the at least two types of hardware processing units is less error-prone than a remainder of the at least two types, the product comprising:

a first section of program instructions for designating as a manager processing unit one of the hardware processing units of the heterogeneous system architecture hardware component under validation that belongs to the less error-prone type, wherein the less error-prone type is of a more mature design and is more reliable than the remainder of the at least two types;

a second section of program instructions for initiating execution, by the manager processing unit, of a tester program code for testing processing units by hardware processing units of the heterogeneous system architecture hardware component other than the manager processing unit;

a third section of program instructions for monitoring by the manager processing unit in a reliable manner the status of the hardware processing units during execution of the tester program code;

a fourth section of program instructions for creating a data record by the manager processing unit, wherein the data record comprises data related to a test failure detected during execution of the tester program code; and, a fifth section of program instructions for halting, by the manager processing unit, execution of the tester program code by hardware processing units of the heterogeneous system architecture hardware component other than the manager processing unit upon detection of a test failure and prior to the data record creation.

15. The computer program product of claim 14, further comprising an additional section of program instructions for performing, by the manager processing unit, an initialization procedure prior to execution of the tester program code.

16. The computer program product of claim 14, wherein said first section of program instructions further comprises instructions for determining the manager processing unit designation.

* * * * *